(12) United States Patent
Takahashi (10) Patent No.: US 6,774,843 B2
(45) Date of Patent: Aug. 10, 2004

(54) METHOD FOR ACQUIRING AZIMUTH INFORMATION

(75) Inventor: Masato Takahashi, c/o Communications Research Laboratory, Independent Admin. Institution 4-2-1 Nukui-kitamachi, Koganei-shi, Tokyo (JP)

(73) Assignees: Communications Research Laboratory, Independent Administrative Institution, Koganei (JP); part interest; Masato Takahashi, Koganei (JP); part interest ( * ) Notice: Subject to any disclaimer, the term of this patent is extended or adjusted under 35 U.S.C. 154(b) by 17 days.

(21) Appl. No.: 10/103,881

(22) Filed: Mar. 25, 2002

(65) Prior Publication Data

US 2002/0175858 A1 Nov. 28, 2002

(30) Foreign Application Priority Data

Mar. 28, 2001 (JP) ........................................ 2001-093966

(51) Int. Cl.[7] .............................. G01S 5/02; H04B 7/185
(52) U.S. Cl. ............................ 342/357.15; 342/357.06; 701/213
(58) Field of Search ........................ 342/357.15, 357.06; 701/213

(56) References Cited

U.S. PATENT DOCUMENTS

| 5,144,318 A | 9/1992 | Kishi |
| 5,341,301 A | 8/1994 | Shirai et al. |
| 5,589,836 A | 12/1996 | Noetzel |
| 6,018,315 A | 1/2000 | Ince et al. |

FOREIGN PATENT DOCUMENTS

| DE | 40 02 176 | 8/1990 |
| DE | 41 42 403 | 7/1992 |
| DE | 44 15 083 A1 | 11/1995 |
| EP | 0 901 182 | 3/1999 |

OTHER PUBLICATIONS

J. Huang, 37th IEEE Vehicular Technology Conference, pp. 113–117, "L–Band Phased Array Antennas for Mobile Satellite Communications", 1987.

R. Mittra, et al., In Antennas and Propagation Society internation. Symposium, pp. 1478–1481, "Microstrip Patch Antennas for GPS Applications", 1993.

Patent Abstracts of Japan, JP 08–111611, Apr. 30, 1996.

Edited by Bradford W. Parkinson, et al., Published by the American Institute of Aeronautics and Astronautics, Inc., vol. 1, pp. 342–343 and 722–723, "Global Positioning System: Theory and Applications", 1996.

M. Haneishi, et al., Published by the Institute of Electronics, Information and Communication Engineers, pp. 100–101, "Small Plane Antennas", Aug. 10, 1996 (reference is in Japanese, please see Statement of Relevancy).

*Primary Examiner*—Theodore M. Blum
(74) *Attorney, Agent, or Firm*—Oblon, Spivak, McClelland, Maier & Neustadt, P.C.

(57) ABSTRACT

A method for acquiring azimuth information enables acquisition of azimuth information by receiving signals transmitted by GPS satellites using only a single antenna. The method includes steps of disposing a GPS planar antenna having a hemispherical beam with its beam center horizontal to form a sky coverage area of antenna sensitivity that is a sky quarter-sphere in the direction the GPS antenna faces, causing a GPS receiver connected to the GPS antenna to attempt reception of signals transmitted by GPS satellites, inputting the received signals to a data processing unit to discriminate satellites present in the coverage area, arranging the satellites found to be present in the sky coverage area in clockwise order as viewed from the start azimuth of the sky coverage area; extracting the azimuth of the satellite corresponding to the last term in the order as a start azimuth and the direction opposite the azimuth of the satellite corresponding to the first term in the order as an end azimuth, using the extracted start azimuth and end azimuth to limit the azimuth of the direction in which the antenna faces, and outputting the limited azimuth information as voice message or an image using a result output unit.

4 Claims, 4 Drawing Sheets

METHOD FOR ACQUIRING AZIMUTH INFORMATION

BACKGROUND OF THE INVENTION

1. Field of the Invention

This invention relates to a method for acquiring azimuth information using signals transmitted from GPS (global positioning system) satellites.

2. Description of the Prior Art

Previously, positioning information such as latitude, longitude, altitude and GPS (Global Positioning System) time were readily obtainable from signals transmitted by GPS satellites but azimuth information could not be acquired.

The inventor therefore developed a method for acquiring azimuth information by use of a pair of planar patch antennas (Japanese Patent Application Nos. 2000-91362 and 2001-93964).

This method for acquiring azimuth information includes a step of disposing a pair of planar patch antennas back-to-back, parallel to each other and vertical, whereby each planar patch antenna forms a sky coverage area of antenna sensitivity that is a sky quarter-sphere in the direction the antenna faces; a step of causing receiver units connected to the respective antennas to extract strength values of all received GPS satellite signals; a step of discriminating based on a comparison of the extracted signal strength values the antenna in whose sky coverage area the GPS satellite that transmitted each signal is present; a step of arranging the results of the step of discriminating areas of satellite presence in a ring-like sequence; and a step of determining or limiting an azimuth of a measurement direction based on information contained in a ring-like discrimination results sequence.

In order to implement this method for acquiring azimuth information in a commercially available GPS receiver, the inventor further developed a GPS receiver including a data transmitting unit, a data receiving unit and a data processing unit (Japanese Patent Application No. 2000-364605).

This made it possible to readily acquire azimuth information by disposing a pair of planar patch antennas back-to-back, parallel to each other and vertical, disposing a pair of GPS receivers so that the data transmitting unit and data receiving unit of each GPS receiver faces the data receiving unit and data transmitting unit of the other, thereby enabling GPS satellite data received by one GPS receiver to be transmitted to the other GPS receiver, and processing the two sets of data with the data processing unit.

Azimuth information acquired from GPS satellite signals is more reliable than azimuth information acquired using a compass that is affected by magnetic fields.

However, the foregoing method for acquiring azimuth information proposed by the inventor requires two planar antennas to be disposed in parallel and the data acquired by one of the GPS receivers to be transmitted to the other. It therefore requires at least two antennas and means for transmitting data between the two GPS receivers.

The present invention was accomplished in light of the foregoing circumstances and has as an object to provide a very simple method for acquiring azimuth information that enables acquisition of azimuth information with only a single planar antenna and a single GPS receiver.

SUMMARY OF THE INVENTION

This invention achieves this object by providing a method for acquiring azimuth information comprising:

a step of disposing a single GPS planar antenna having a hemispherical antenna pattern with its beam center horizontal to form a sky coverage area of antenna sensitivity that is a sky quarter-sphere in the direction the GPS antenna faces bounded by a great semicircle passing through the zenith;

a step of causing a GPS receiver connected to the GPS antenna to attempt reception of signals transmitted by GPS satellites in the sky hemisphere;

a step of discriminating from the received signals the satellites present in the coverage area;

a step of using azimuths of the satellites obtained by a positioning calculation process to arrange the satellites found to be present in the sky coverage area in clockwise order as viewed from the sky coverage area start azimuth; and a step of limiting the azimuth of a direction in which one side of the great semicircle faces within an azimuth range defined clockwise whose start azimuth is the azimuth of the satellite corresponding to the last in said order and whose end azimuth is the reverse direction from the azimuth of the satellite corresponding to the first in said order.

In one aspect of the present invention, the method further comprises:

a step of turning the GPS planar antenna 180 degrees;

a step of causing the GPS receiver connected to the GPS antenna to attempt reception of signals transmitted by GPS satellites in the sky hemisphere and limit the azimuth of the direction in which the other side of great semicircle faces by the same steps as set out above; and a step of limiting a single azimuth by taking the common product of sets of the azimuth obtained in the first GPS antenna attitude and the azimuth obtained in the second GPS antenna attitude.

In another aspect of the present invention, the method further comprises a step of mounting the GPS antenna on the head and putting the antenna in a horizontal state or a vertical state in accordance with information to be acquired.

As set out in the foregoing, the present invention enables acquisition of azimuth information using a single GPS antenna having a hemispherical antenna pattern and is therefore extremely simple and economical.

The above and other objects and features of the invention will become apparent from the following description made with reference to the drawings.

DESCRIPTION OF THE PREFERRED EMBODIMENT

An embodiment of a device for acquiring azimuth information that is a concrete implementation of the method for acquiring azimuth information according to the present invention will now be explained in detail with reference to the attached drawings.

In the following explanation, degree (deg) is used as the unit for angles, with north defined as 0 degree and, moving clockwise, east as 90 degrees, south as 180 degrees and west as 270 degrees. Angle of elevation is defined as 0 degree at horizontal and 90 degrees at zenith.

Figure 1:
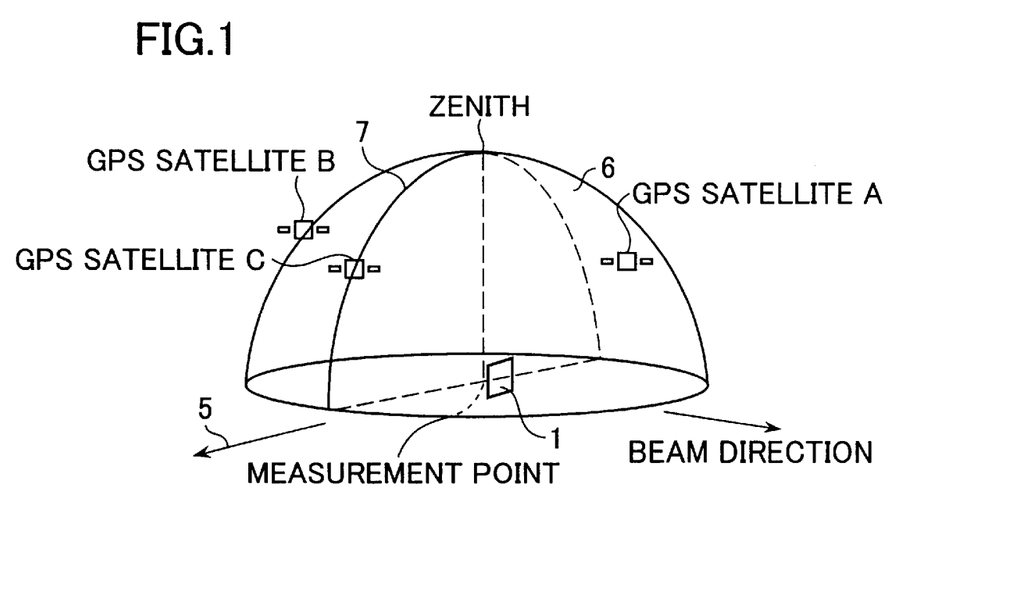
FIG. 1 is a conceptual diagram illustrating the principle of azimuth information acquisition by the method for acquiring azimuth information of the present invention.

The azimuth limitation acquisition principle of the present invention will first be explained with reference to FIG. 1. Near the middle of FIG. 1 is disposed a planar patch antenna 1. The patch antenna 1 is disposed perpendicular to the ground. The direction in which an observer faces when standing on the ground and looking down on the planar patch antenna 1 with the antenna disposed facing leftward, is defined as the measurement direction 5 of the observer.

The patch antennas 1 is provided with a hemispherical beam pattern with respect to the circularly polarized wave used by the GPS satellite system. The antenna having a hemispherical beam has on rare occasions been referred to in technical papers as being nondirectional. Since strictly speaking "nondirectional" in this context means "isotropic," however, the term "nondirectional" will not be used as a modifier with respect to the hemispherical beam pattern in this specification. The patch antenna 1 stands perpendicular to the ground. Half of the hemispherical beam is therefore directed toward the ground and is unusable. The remaining half has sensitivity in the direction of the sky.

When the planar patch antenna 1 is disposed perpendicular to the ground in this manner, its substantial coverage area coincides with half of the sky divided in two by a semicircle that is part of a great circle, as shown in FIG. 1. This great circle is the great circle 7 forming the boundary between the sky coverage area 6 of the planar patch antenna 1 and the remainder of the sky. In other words, the coverage area of the planar patch antenna 1 is the sky quarter-sphere in which the GPS satellite A is present in FIG. 1 and the sky quarter-sphere in which the GPS satellite B is present is not a coverage area of the planar patch antenna 1.

The positioning radio wave transmitted by a GPS satellite has a microwave band frequency in the vicinity of 1.5 GHz and, therefore, exhibits excellent linear propagation property like light. The GPS planar patch antenna 1 can synchronize with signals from the GPS satellite A in the sky coverage area 6 but cannot synchronize with signals from the GPS satellite B that is not in the sky coverage area 6 of the planar patch antenna 1. The regions in which the GPS satellite A and GPS satellite B are located can therefore be determined based on whether or not synchronism is established. Azimuth limitation of the measurement direction 5 can be achieved by merging the GPS satellite region-of-presence discrimination and the GPS satellite azimuth information.

Major characteristics of a planar patch antenna used for azimuth information acquisition include small size, light weight, ease of manufacture and low cost. In the actual fabrication of a planar patch antenna, the completed antenna may have a right-handed circularly polarized wave beam pattern of a solid angle slightly broader than the hemisphere that is the right-handed circularly polarized wave beam pattern theoretically calculated at the time of design assuming an infinite ground plane. This occurs because the result of the design assuming an infinite ground plane in the theoretical calculation differs from the actual situation. This is discussed in the following literature references:

Small Plane Antennas: Misao Haneishi, Kazuhiro Hirasawa and Yasuo Suzuki Published by the Institute of Electronics, Information and Communication Engineers, Aug. 10, 1996, P100.

Global Positioning System: Theory and Applications Volume I Edited by Bradford W. Parkinson and James J. Spilker Jr. Published by the American Institute of Aeronautics and Astronautics, Inc. 1996, P342–P343, P722.

The technique of correcting such beam shape deviation by slightly modifying the substrate size, patch size or the like to obtain the desired antenna pattern is known as antenna pattern shaping.

When, differently from the sky hemisphere according to the design calculations, the fabricated result turns out to have a beam larger than the sky hemisphere, the desired sky hemisphere beam antenna can be easily configured by disposing a shielding substance composed of a radio wave shielding material on the rear side to eliminate the unwanted sensitivity portion.

Figure 2:
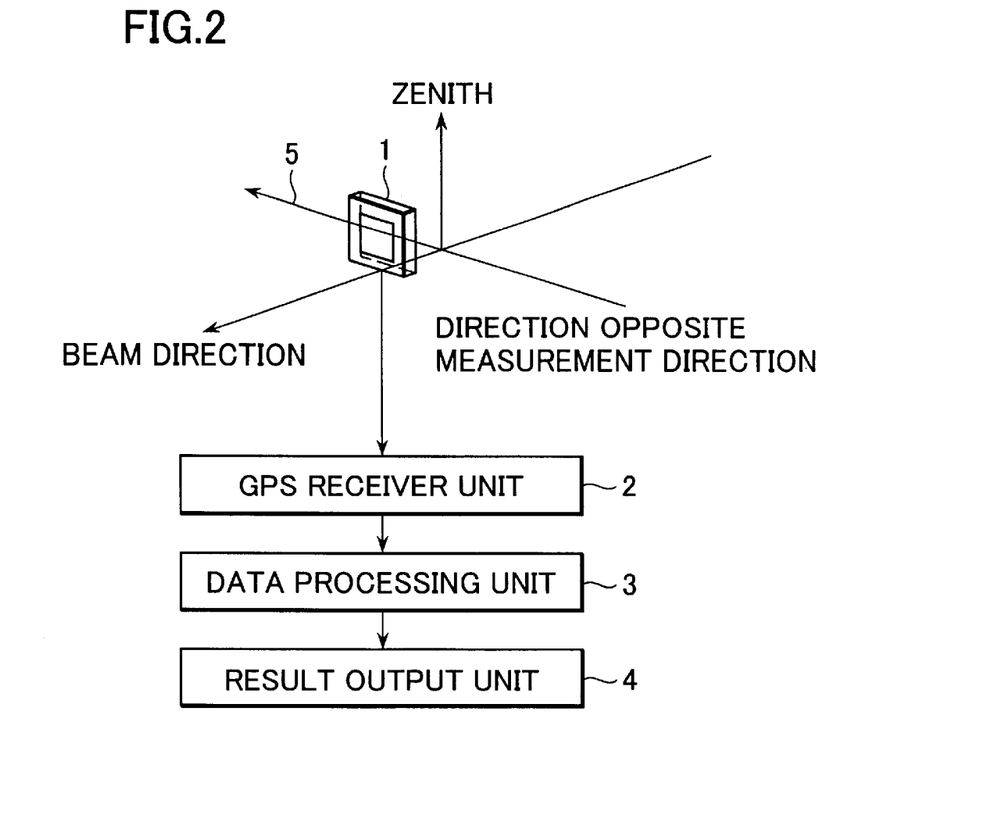
FIG. 2 is a schematic diagram illustrating an embodiment of a device for acquiring azimuth information that is a concrete implementation of the method for acquiring azimuth information according to the present invention.

A device for acquiring azimuth information that is an embodiment of the method for acquiring azimuth information according to this invention will now be explained with reference to FIG. 2. In FIG. 2, the planar patch antenna 1 is connected to a GPS receiver unit 2.

The GPS receiver unit 2 shown in FIG. 2 can have the same functional features and specifications as the GPS receivers included in widely-used compact mobile positioning devices employing L1-band signals. This makes it possible to take advantage of technologies developed for the production of small, light-weight civilian GPS positioning devices, most notably size reduction and ease of volume production. Thanks to size and weight reduction achieved in civilian GPS positioning devices, GPS receivers are abundantly available in sizes commensurate with planar patch antennas. They are also easy to manufacture. Moreover, these GPS receivers have planar patch antennas formed integrally with the receiver case, and inexpensive palm-sized models are already available. Production technologies are well established. The considerable store of miniaturization technologies available today can be utilized for economical fabrication of the device according to this invention.

The GPS receiver periodically outputs the following data string at a period of, for example, once a second or shorter. In other words, it is built to ordinary specifications. Data such as the following are included in the data string: first, the current time, further, as positioning data, the latitude, longitude, altitude, positioning calculation time, positioning calculation mode (indicating whether two-dimensional positioning using three satellites or three-dimensional positioning using four satellites), the satellite number assigned to channel 1, the satellite angle of elevation of the satellite assigned to channel 1, the satellite azimuth of the satellite assigned to channel 1, the channel state regarding synchronization with the signal from the satellite assigned to channel 1, the satellite number assigned to channel 2, the satellite angle of elevation of the satellite assigned to channel 2, the satellite azimuth of the satellite assigned to channel 2, the channel state regarding synchronization with the signal from the satellite assigned to channel 2, . . . and the satellite number assigned to channel n, the satellite angle of elevation of the satellite assigned to channel n, the satellite azimuth of the satellite assigned to channel n, the channel state regarding synchronization with the signal from the satellite assigned to channel n. The number of used channels n is ordinarily 12. As the GPS receiver can concurrently synchronize with the signals of these 12 satellites, its specifications can be called ordinary by current standards. The present invention can utilize such an L1-band wave GPS receiver and planar antenna available on the general market substantially without modification.

The GPS receiver unit 2 attempts to synchronize with and decode satellite signals through the first planar patch antenna 1 and to determine position. The GPS receiver unit 2 conducts a search for the signals from all GPS satellites expected to be present in the sky, just as does the GPS receiver of an ordinary mobile satellite-positioning device, in exactly the same way as if connected with an antenna whose coverage area is the sky hemisphere.

The radio wave transmitted from a GPS satellite contains information on the orbits of all GPS satellites (almanac data). Every satellite transmits these data. Therefore, in the case of a satellite present in the sky at an angle of elevation of greater than 0 degree viewed from the current location but whose signal is blocked by a building or the topography, or of a satellite not in the antenna coverage area with whose signal synchronization cannot be established, the angle of elevation and azimuth of the satellite concerned can be computed and output by a simple calculation from data received from another GPS satellite whose signal was established by the antenna. Equipment that outputs such information actually exists.

Although all GPS satellites transmit signals at exactly the same frequency, owing to the utilization of a technology called the spread spectrum communication system made possible by pseudo random coding, signal interference does not occur even when using the same frequency. In pseudo random coding, each GPS satellite is assigned a different digital signal sequence wherein 0 and 1 appear to alternate irregularly. This enables the signals from the satellites to be distinguished and separately received. In other words, the principle of pseudo random coding makes it easy to discriminate the angles of elevation in the sky and the azimuths of all GPS satellites present at an angle of elevation of greater than 0 degrees as viewed from the current location as well as to establish or not establish synchronization with the signals from the individual satellites, i.e., to differentiate the reception state and receive the signals from the satellites.

In the process of conducting the signal search with the GPS receiver, the data of each satellite, i.e., the satellite number of the GPS satellite, satellite angle of elevation, satellite azimuth and channel state, are periodically output by GPS receiver. The positioning result data, i.e., the latitude, longitude, altitude, positioning calculation time, positioning calculation mode and current time, are also periodically output by GPS receiver. There is no particular restriction on the data output period. GPS receivers that output data about once per second are currently in wide use. A shorter output period is also workable if available.

The data acquired by the GPS receiver unit 2 are input to a data processing unit 3. The data processing unit 3 processes the data in the following manner.

Among the satellite data, only data of satellites whose channel state is synchronized and whose satellite angle of elevation is 85 degrees or less are extracted. The reason for excluding satellites whose angles of elevation are greater than 85 degrees is that satellites with high angles of elevation near the zenith, while being observed to have azimuths that differ numerically, are very small in actual elongation.

Azimuth limitation is possible if at least one satellite is extracted.

In order to conduct azimuth limitation, the extracted satellites are ordered by the following rule.

If only one satellite was extracted, it is defined as the first item of the order and also as the last item.

If there are two or more extracted satellites, the procedure is as follows. Create a clockwise circular order with respect to the satellite azimuths. If the spacing between the azimuth of a certain satellite (here called A) and the azimuth of the next satellite win the clockwise direction (B) is 180 degrees or greater, define the certain satellite (A) as the last term and the next satellite (B) as the first term. Order the other satellites (other than A and B) by their satellite azimuths as viewed clockwise from the first term (B).

The measurement direction is limited as follows.

Specifically, the measurement direction is limited within an azimuth range defined in the clockwise direction between a start azimuth that is the azimuth of the satellite associated with the last term and an end azimuth that is the direction opposite the azimuth of the satellite associated with the first term.

The data processing unit 3 forwards the result of the processing to a result output unit 4.

The functioning of the result output unit 4 will now be explained.

The result output unit 4 outputs the result of the azimuth limitation of the measurement direction to the observer. In the exceptional case where the number of extracted satellites is zero, the result output unit 4 advises the observer to retry the measurement after moving to a point where the sky is unobstructed.

The result output unit 4 conveys the information to the observer as a voice message. Although output of an audible message has the advantage of permitting even a visually impaired person to receive support regarding appropriate action, the information can alternatively be output on a liquid crystal display.

The information output at this time can include: azimuth information for the measurement direction (result of azimuth limitation), current time (GPS time), latitude, longitude, altitude, latest positioning time, and advice to the observer in the case of exception handling. For example, when not even a single satellite signal can be picked up, the observer is advised to retry the measurement after moving to a place where the sky is more open.

Regarding the method of outputting the azimuth of the measurement direction 5 in azimuth limitation, if the rotation direction has been established, a message can be communicated to the observer by providing the set ($\alpha$, $\beta$), where $\alpha$ is the start azimuth and $\beta$ is the end azimuth. However, it is also possible to define a rough azimuth (hereinafter $\theta$) and a unilateral deviation (hereinafter $\delta$), and to output a message in the form of ($\theta$,$\delta$). $\theta$ and $\delta$ are given by:

$$\theta = \alpha + (\delta/2)$$

$$\delta = \{(360+\beta-\alpha) \text{MOD} 360\}/2$$

where x MOD y is the remainder of dividing x by y.

Insofar as the direction of rotation has been defined, either of the ($\alpha$, $\beta$) mode information and ($\theta$, $\delta$) mode information can be immediately converted to the other. The observer can be supplied with information in either mode since the modes do not particularly differ in the numerical significance of the information conveyed. It is therefore possible to enhance observer convenience by enabling the observer to select whichever mode is more suitable for the purpose at hand. Otherwise the information can be output in both modes.

When more convenient for the observer, certain angle can be continually added to the result output before passing it on to the observer. For example, if the planar patch antenna 1 is worn on the observer's back, the measurement direction 5 will be directed laterally left from the observer's body.

When this arrangement is adopted, it is more convenient for the observer if the result output unit 4 always outputs values converted to those for the direction forward of the observer, i.e., values obtained by adding 90 degrees to the result. One example will be explained.

Figure 3:
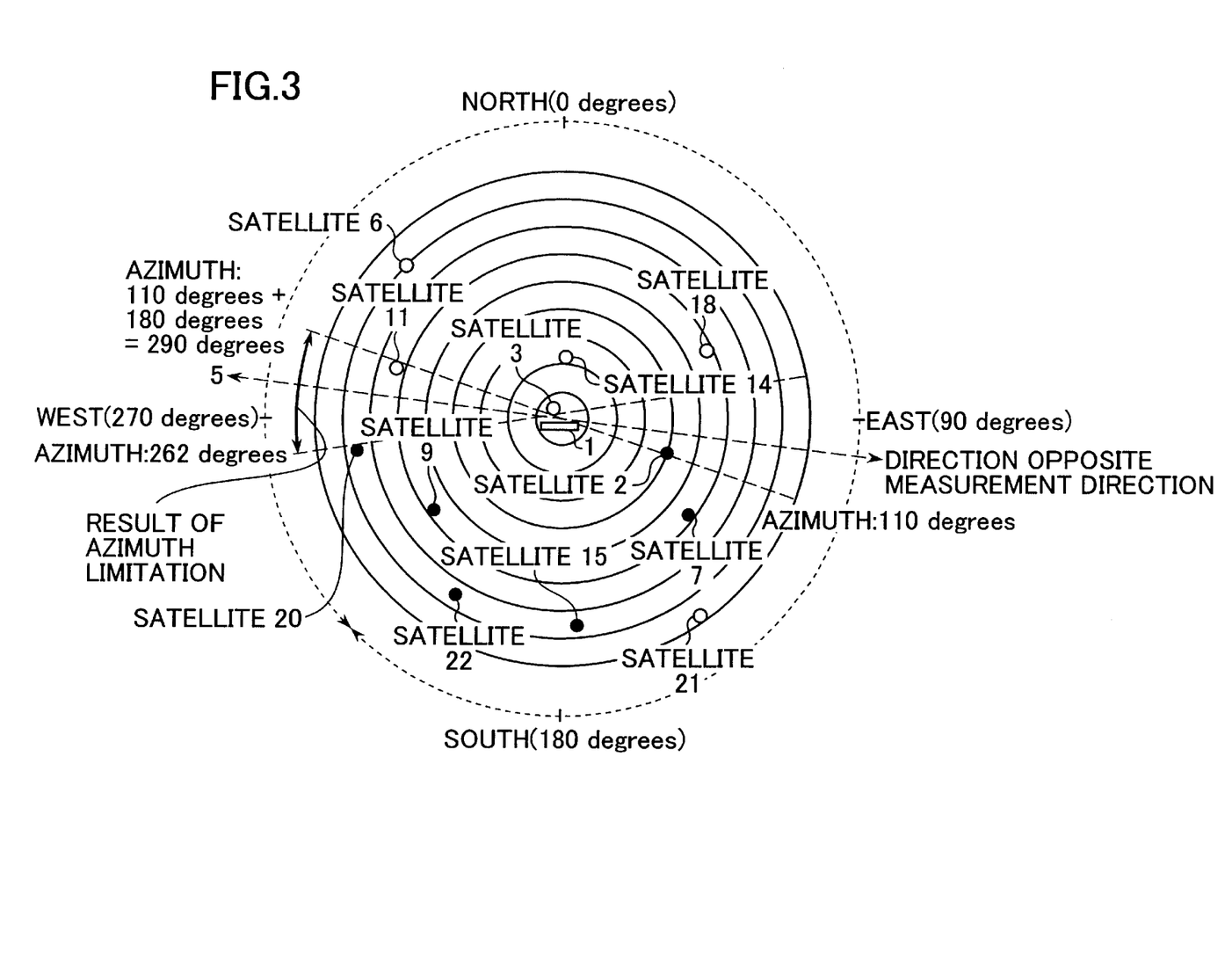
FIG. 3 is a schematic diagram illustrating a relationship between an arrangement of space satellites and an antenna when azimuth limitation is conducted using the device for effecting azimuth limitation shown in FIG. 2.

FIG. 3 shows an example of the relationship between an arrangement of space satellites and the antenna 1 when azimuth limitation is conducted using the device for acquiring azimuth information according to the foregoing embodiment. The pattern of concentric circles in FIG. 3 represents an imaginary view of the sky hemisphere whose center is zenith at the ground point of the observer, taken looking downward from a point higher than zenith. Angle of elevation is 0 degree at the outermost circle and increases inwardly in increments of 10 degrees with each successive concentric circle. Azimuth is denoted as "North (0 degree)", followed clockwise by "East (90 degrees)," "South (180 degrees)," and "West (270 degrees)." The small dots at scattered locations indicate the locations of GPS satellites by angle of elevation and azimuth. Twelve satellites are shown. Some dots are solid (black) and others open (white).

A black dot designates a GPS satellite later discriminated to be present in the coverage area of the planar patch antenna 1 and having a satellite angle of elevation of not greater than 85 degrees. All other GPS satellites are represented as white dots.

The observer does not know the arrangement of the satellites in the sky viewed from his or her location. The observer, who has no information regarding direction (azimuth), places the planar antenna 1 in an arbitrary direction, as shown in FIG. 3, With the antenna perpendicular to the ground. The measurement direction 5 is indicated by a dashed line. The reverse direction (diametrically opposite direction) of the measurement direction 5 is also indicated.

When the device for acquiring azimuth information is put in operation, data like that shown in Table 1 are sent from the GPS receiver unit 2 to the data processing unit 3. The reason for satellite 21 not being synchronized is probably because it is blocked by some ground feature. Blocking by ground features is not uncommon and can be considered a normal state. The presence of ground feature blocking is tolerable.

TABLE 1

| Satellite number | Azimuth (deg) | Elevation angle (deg) | Channel state in GPS receiver |
|---|---|---|---|
| 14 | 6 | 68 | — |
| 18 | 64 | 32 | — |
| 2 | 110 | 49 | Sync |
| 21 | 144 | 4 | — |
| 7 | 128 | 31 | Sync |
| 15 | 177 | 15 | Sync |
| 22 | 218 | 13 | Sync |
| 9 | 236 | 32 | Sync |
| 20 | 262 | 12 | Sync |
| 11 | 285 | 28 | — |
| 6 | 313 | 9 | — |
| 3 | 340 | 86 | — |

Of the data in this table, only the data for the satellites that have synchronized channel states and satellite angle of elevation of not greater than 85 degrees are extracted. Namely, the data for the satellites numbered 2, 7, 15, 22, 9 and 20 are extracted.

For azimuth limitation, the extracted satellites are ordered by the following rule.

If there are two or more extracted satellites, the procedure is as follows. Create a clockwise circular order with respect to the satellite azimuths. If the spacing between the azimuth of a certain satellite (here called A) and the azimuth of the next satellite in the clockwise direction (B) is 180 degrees or greater, define the certain satellite (A) as the last term and the next satellite (B) as the first term. Order the other satellite (other than A and B) by their satellite azimuths as viewed clockwise from the first term (B).

Here, therefore, satellite 20 is selected as the last term and satellite 2 as the first term.

The measurement direction is limited as follows.

The measurement direction is limited within an azimuth range defined in the direction between a start azimuth that is the azimuth of the satellite associated with the last term (satellite number 20; 262 degrees) and an end azimuth that is the direction opposite the azimuth of the satellite associated with the first term (satellite number 2; 110 degrees+180 degrees=290 degrees).

The data processing unit 3 forwards this result to the result output unit 4.

The result output unit 4 informs the observer that the measurement direction is in the azimuth range defined in the clockwise direction between a start azimuth of 262 degrees an end azimuth of 290 degrees.

The information output at this time includes the result of the azimuth limitation of the measurement direction and can further include the current time, latitude, longitude, altitude and latest positioning time.

The information regarding the measurement direction 5 obtained in azimuth limitation can be output in the form of ($\theta$, $\delta$), where ($\theta$) is a rough azimuth and ($\delta$) is a unilateral deviation. When $\alpha$=262 and $\beta$=290, $\theta$ and $\delta$ are given by:

$\theta=\alpha+(\delta/2)=276$ $\delta=\{(360+\beta-\alpha)\text{MOD }360\}/2=14.$ In other words, the rough azimuth is 276 degrees and the unilateral deviation is 14 degrees.

The feasibility of concretizing the present invention in an inexpensive and compact configuration will now be discussed.

Recent GPS receivers consist of a microprocessor for signal processing and an associated electronic printed-circuit board and the size of the physical unit is therefore small. The small size of the constituent components is apparent from the fact that numerous portable GPS receiving units small enough to hold easily on the palm of the hand are actually available these days. Obviously, the constituent components are very small. The device for acquiring azimuth information that is an embodiment of the method of acquiring azimuth information according to the present invention can be constituted utilizing the components used in these portable GPS receiving units and can therefore be realized as a compact unit of small volume. For example, the GPS receiver unit 2 and the data processing unit 3 can be mounted on the rear surface of the planar patch antenna 1. The result output unit 4 can be arranged to output audible messages through a speaker or earphones.

Since, as explained in the foregoing, the invention method can acquire azimuth information using only a single GPS planar antenna, it can be worn on the head or body of the observer, who can acquire azimuth information while moving about.

Figure 4A:
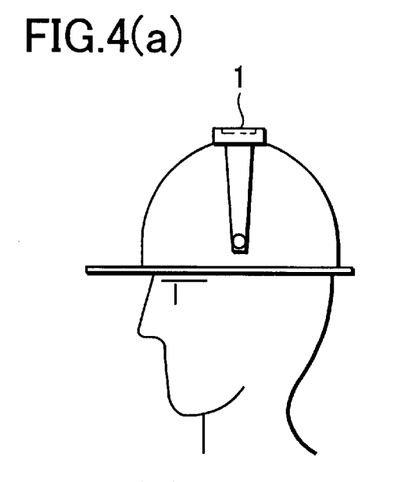
FIG. 4(a) is a diagram for explaining how an antenna is worn on the head when priority is placed on positioning information acquisition capability.
Figure 4B:
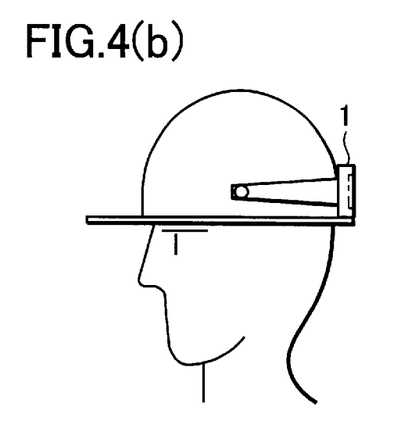
FIG. 4(b) is a diagram for explaining how the antenna is worn on the head when priority is placed on azimuth information acquisition capability.
Figure 4C:
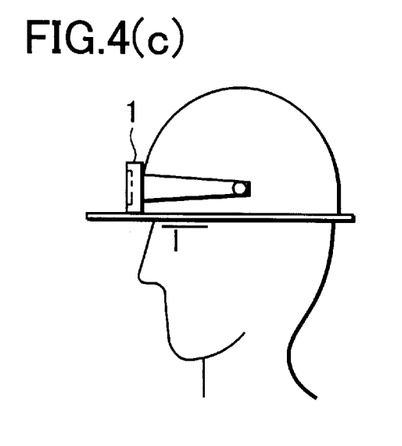
FIG. 4(c) is a diagram for explaining how the antenna is worn on the head when priority is placed on azimuth information acquisition capability.

Head mounting using a cap or helmet is illustrated in FIG. 4. FIG. 4(*a*) shows the antenna 1 positioned horizontally on top of the head, FIG. 4(*b*) shows it positioned vertically at the back of the head, and FIG. 4(*c*) shows it positioned vertically at the front of the head. Such a configuration that makes it easy to switch among different mounting orientations adds to utility and convenience.

Figure 5A:
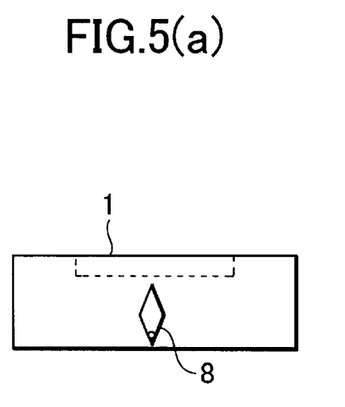
FIG. 5(a) is a diagram for showing the state of mercury switch contacts when a device for acquiring azimuth information configured for head mounting is used with priority on positioning information acquisition capability.
Figure 5B:
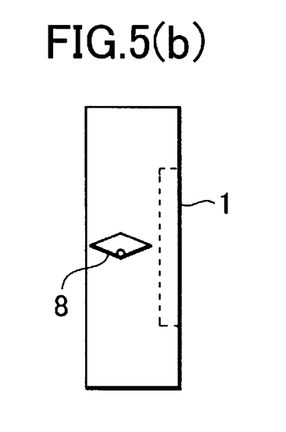
FIG. 5(b) is a diagram for showing the state of mercury switch contacts when the device for acquiring azimuth information configured for head mounting is used with priority on azimuth information acquisition capability.
Figure 5C:
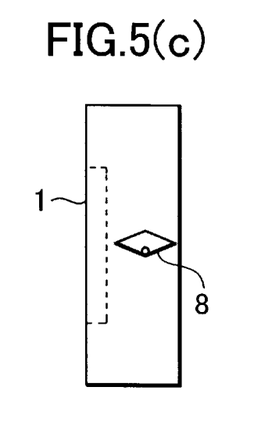
FIG. 5(c) is a diagram for showing the state of mercury switch contacts when the device for acquiring azimuth information configured for head mounting is used with priority on azimuth information acquisition capability.

When a mercury switch 8 is built into a receiver integrated with the antenna 1 as shown in FIG. 5 and the antenna 1 is positioned horizontally on top of the head as shown in FIG. 4(*a*) the mercury of the mercury switch 8 comes to be located at a contact that activates positioning function (FIG. 5(*a*)). When the antenna 1 is positioned vertically at the rear of the head as shown in FIG. 4(*b*), the mercury of the mercury switch 8 moves to another contact that activates the azimuth limitation function (FIG. 5(*b*)), and when the antenna 1 is positioned vertically at the front of the head as shown in FIG. 4(*c*), the mercury of the mercury switch 8 moves to another contact that activates the azimuth limitation function (FIG. 5(*c*)). Thus desired information can be obtained simply by changing the mounting position of the antenna.

When the antenna 1 is positioned vertically at the back of the head, the unadjusted measurement direction 5 will be directed laterally left from the observer's body. In this case, it is more convenient for the observer to preset the data processing unit 3 to constantly add 90 degrees to the measurement result so that the output result will be aligned with the direction the observer faces. Similarly, in this case where the antenna 1 is positioned vertically at the front of the head, since the unadjusted measurement direction 5 will be directed laterally right, it is more convenient for the observer to preset the data processing unit 3 to constantly subtract 90 degrees from the measurement result so that the output result will be aligned with the direction the observer faces.

As can be seen from the configuration illustrated in FIG. 2, the device for acquiring azimuth information that is a concrete implementation of the invention method is equipped with the equipment required for positioning and can therefore acquire positioning information. In middle latitude regions, around 8 to 12 GPS satellite are constantly present in the sky hemisphere. This means that there are always 4 to 6 satellites on each side of a great semicircle passing through the zenith. By the principle involved, two-dimensional positioning is possible with as few as three satellites and three-dimensional positioning is possible with as few as four satellites. The number of satellites present in the sky hemisphere is therefore sufficient for positioning. The positioning result sent from the GPS receiver unit 2 to the data processing unit 3 can be output as is from the result output unit 4.

As set out above, so long as the sky is unobstructed, a number of satellites sufficient for positioning will usually be available even when the antenna 1 is constantly disposed vertically. Utilization of the positioning function with the antenna 1 oriented solely in the horizontal direction is, however, advantageous in the point that the number of usable satellites increases, thereby increasing the number of selectable satellite sets and, as a result, increasing the probability that a satellite set that improves the DOP (Dilution of Precision) value can be selected. In other words, some measure of improvement in positioning accuracy can be anticipated.

Moreover, if the observer manually switches the antenna 1 from the condition in FIG. 4(b) to that in FIG. 4(c) with no change of posture, azimuth information acquisition can be conducted just as if two antennas and two GPS receivers were being used.

For this, the result output unit 4 retains the following three types of data in memory. The first type is the azimuth limitation result. The second is data indicative of whether the measurement was conducted with the antenna in the condition of FIG. 4(b) or FIG. 4(b) (which can be automatically discriminated from the position of a mercury switch or metal ball switch). The third is time that the azimuth limitation was made (this time can be taken from the internal clock of the GPS receiver). These data are stored in the memory of the microprocessor.

The memory can be more effectively utilized by storing only information from the most recent azimuth information acquired in the two vertical orientations of the antenna (FIG. 4(a) and FIG. 4(b)), i.e., by overwriting old data.

When azimuth information is obtained in one of the vertical orientations (e.g., in the orientation of FIG. 4(c)), that azimuth information is output and, in addition, a check is made as to whether azimuth information meeting the description set out below is stored in the memory.

Specifically, it is checked whether the memory contains the result of an azimuth limitation conducted in the other vertical orientation that was acquired within a prescribed time period (e.g., within 6 seconds) of the time of the current azimuth information acquisition conducted in the vertical orientation.

When such a result is found in the memory, it is judged that the observer is attempting to utilize information from both sides of the sky by quickly changing the orientation of the head-mounted antenna without changing his or her posture. Next, therefore, the product of sets of the azimuth limitation result obtained in the other vertical orientation and stored in memory and the azimuth limitation result obtained in the current vertical orientation measurement is calculated and the obtained product of sets is output.

This operation makes it possible to calculate a more precise azimuth information value by using not just the result for the quarter-sphere on one side but also utilizing the result for the quarter-sphere on the other side.

In the measurement described earlier with reference to FIG. 3, in which no result obtained in the other vertical orientation was used, the measurement direction was, as mentioned above, found to fall within a range of 28 degrees. In contrast, the azimuth information result obtained when the other vertical orientation was also used, i.e., when both vertical orientations were used was 23 degrees, meaning an improvement of 5 degrees in the azimuth limitation in the case at hand. In many cases the improvement is even greater.

If the result output unit 4 should at this time output a message to the effect of, "If you did not change your posture between the preceding azimuth information acquisition with the antenna in vertical orientation and the current one, the product of sets of the results in preceding and current azimuth information acquisitions conducted with the antenna in vertical orientation is . . . ," then the observer will be able to distinguish the result obtained when both vertical orientations were used from that obtained in the current vertical orientation, even if both are output concurrently, and will also enjoy an additional advantage.

The procedure for azimuth information acquisition using both vertical orientations will now be explained with respect to a concrete example. This procedure is based on the principle of applying a procedure like that explained above with reference to FIGS. 1 to 3 to the quarter-sphere on the opposite side and outputting the product of sets of the azimuth limitations obtained in the two vertical orientations.

Figure 6:
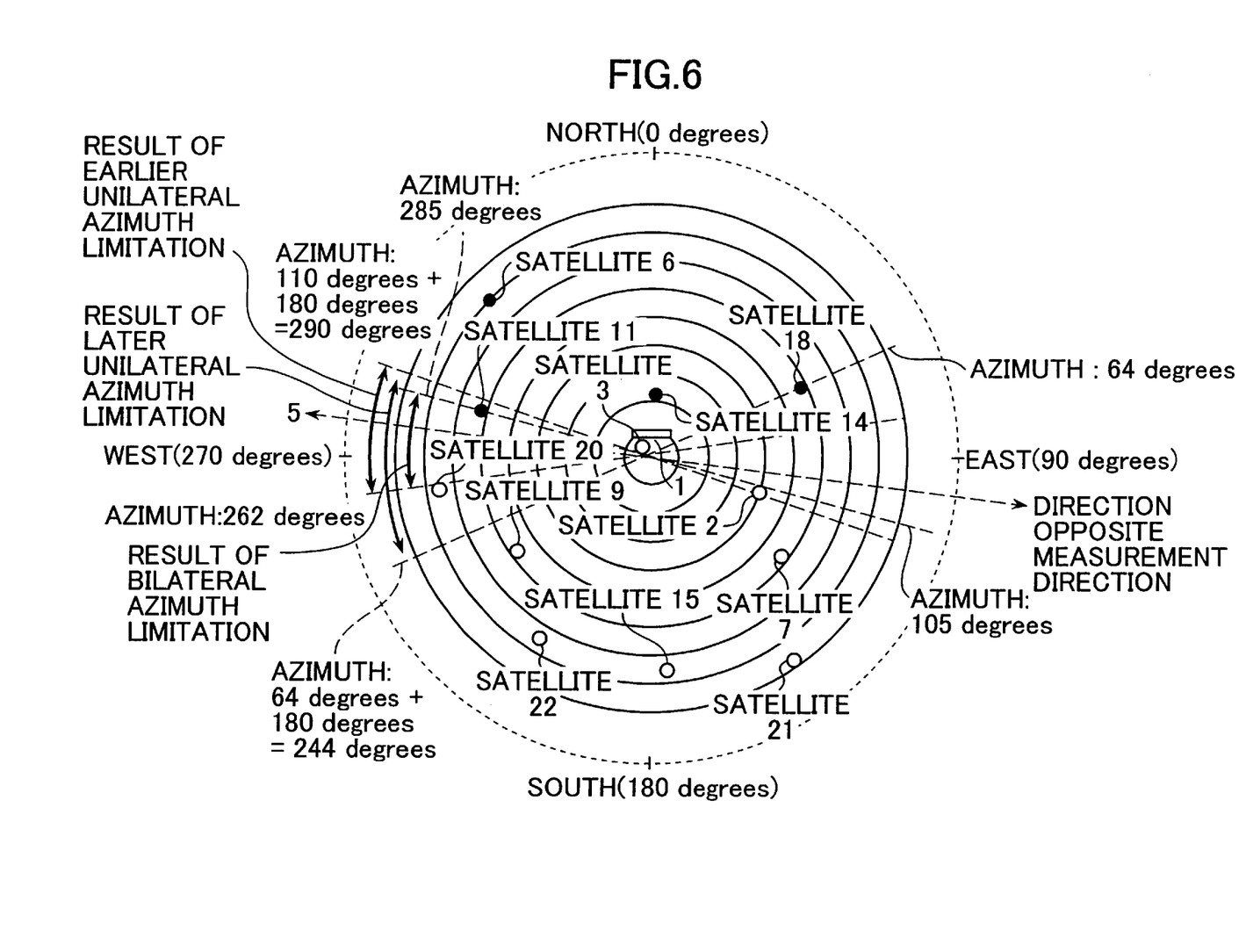
FIG. 6 is a schematic diagram illustrating a relationship between an arrangement of space satellites and an antenna when azimuth limitation is conducted using the device for effecting azimuth limitation with the antenna oriented 180 degrees opposite to that in FIG. 3.

FIG. 6 shows the relationship between the arrangement of space satellites and the planar patch antenna 1 when the planar patch antenna 1 is put in vertical orientation on the opposite side from that in FIG. 3. The figure represents an imaginary view looking downward from a point higher than zenith. Angle of elevation is 0 degree at the outermost circle and increases inwardly in increments of 10 degrees with each successive concentric circle. Azimuth is denoted as "North (0 degree)", followed clockwise by "East (90 degrees)," "South (180 degrees)," and "West (270 degrees)." The small solid (black) dots designate GPS satellites present in the coverage area of the planar patch antenna 1 and having a satellite angle of elevation of not greater than 85 degrees. All other GPS satellites are represented as open (white) dots. The satellite that are outside the coverage area in FIG. 3 are inside the coverage area in FIG. 6.

Table 2 shows the data sent from the GPS receiver unit 2 to the data processing unit 3 at this time.

TABLE 2

| Satellite number | Azimuth (deg) | Elevation angle (deg) | Channel state in GPS receiver |
|---|---|---|---|
| 14 | 6 | 68 | Sync |
| 18 | 64 | 32 | Sync |
| 2 | 110 | 49 | — |
| 21 | 144 | 4 | — |
| 7 | 128 | 31 | — |
| 15 | 177 | 15 | — |
| 22 | 218 | 13 | — |
| 9 | 236 | 32 | — |
| 20 | 262 | 12 | — |
| 11 | 285 | 28 | Sync |
| 6 | 313 | 9 | Sync |
| 3 | 340 | 86 | Sync |

Of the data in this table, only the data for the satellites that have synchronized channel states and satellite angle of elevation of not greater than 85 degrees are extracted. Namely, the data for the satellites numbered 14, 18, 11 and 6 are extracted. (Satellite 3 is synchronized but is excluded because its angle of elevation is greater than 85 degrees.)

For azimuth limitation, the extracted satellites are ordered by the following rule.

When there are two or more extracted satellites, the following rule is followed. Create a clockwise circular order with respect to the satellite azimuths. If the spacing between the azimuth of a certain satellite (here called A) and the azimuth of the next satellite in the clockwise direction (B) is 180 degrees or greater, define the certain satellite (A) as the last term and the next satellite (B) as the first term. Order the other satellite (other than A and B) by their satellite azimuths as viewed clockwise from the term (B).

Here, therefore, satellite 11 is selected as the first term and satellite 18 as the last term.

The measurement direction is immediately limited in accordance with the procedure.

According to the definition of the measurement direction 5 depicted in FIG. 1 and the procedure of acquiring azimuth information set out in the foregoing, the measurement direction in its original sense is automatically limited within an azimuth range defined in the clockwise direction between a start azimuth that is the azimuth of the satellite associated with the last term (satellite number 18; 64 degrees) and an end azimuth that is the direction opposite the azimuth of the satellite associated with the first term (satellite number 11; 285 degrees+180 degrees 105 degrees).

As the data processing unit, however, finds that the memory indicates that there was the result of another azimuth limitation executed in the opposite attitude of the antenna within 6 seconds before, it sets the measurement direction of the current procedure (FIG. 6) as the same direction as the previous procedure (FIG. 3). Assuming that the result based on Table 2 was obtained in the vertical orientation of FIG. 4(c), the azimuth limitation result calculated by the procedure is therefore converted to the opposite direction. That is, it is increased 180 degrees. As a consequence of this, the measurement direction is in the azimuth range defined in the clockwise direction between a start azimuth of (64+180)=244 degrees and an end azimuth of (105+180)=285 degrees as shown in FIG. 6.

Assuming that the result based on Table 1 and FIG. 3 was obtained in the vertical orientation of FIG. 4(b), the azimuth limitation of the measurement direction X in this case was 262<X<290 degrees. The width was 28 degrees. The symbol< is used here to indicate that the order of azimuth appearance is clockwise.

The azimuth limitation of the measurement direction obtained for the other vertical orientation alone was 244<X<285. The width was 41 degrees.

The product of sets of these two results each obtained solely in a unilateral vertical orientation was 262 <X <285. The width was 23 degrees. This azimuth limitation result is narrower than either of the results in a single vertical orientation (28 degree width or 41 degree width). Thus the result obtained by taking the product of sets was better than the result for either side alone. In other words, maximum narrowing of the azimuth limitation width was achieved.

Thus better azimuth information can be obtained by simultaneously utilizing. data obtained for the quarter-spheres on both sides than by utilizing only data for the quarter-sphere on one side. In accordance with the present invention, this can be achieved with a very simple configuration. Namely, it can achieved with a simple configuration employing only a single GPS receiver and a single planar antenna, rather than two of each.

The foregoing effect can also be obtained without movement of the arms etc., merely by aligning the faced direction with the zenith direction or with the nadir direction. This is because functional switching by the mercury switch also enables appropriate orientation of the antenna with respect to the sky. If an observer with the head-mounted device of FIG. 4(a) first faces in the zenith direction to perform azimuth limitation with the device in a first vertical orientation (corresponding to FIG. 4(b) and then immediately faces in the nadir direction to perform azimuth limitation with the device in a different vertical orientation (corresponding to FIG. 4(c), there can easily be obtained an azimuth limitation result that is the product of sets of the two azimuth limitations. This method is convenient for use, for example, when the observer's arms are full.

The present invention makes it possible to obtain high-level results, like those obtained using data from satellites in both quarter-spheres, with a simple structure using equipment for only one side. The present invention can therefore be implemented at relatively low development cost. As it can be implemented to be simple to operate, moreover, it is highly practical. Since implementation is possible using only one set of equipment instead of the two sets conventionally required for the opposite sides, the invention markedly enhances weight reduction and portability. It is also highly practicable in the point that it can be implemented using widely available and inexpensive L1-band satellite positioning equipment with only minimal modifications.

Although the present invention has been described with respect to a specific embodiment illustrated in the drawings, the invention is in no way limited to the described arrangement and changes and modifications may be made without departing from the scope of the attached claims.

As explained in the foregoing, the method for acquiring azimuth information according to the present invention makes it possible to rapidly conduct azimuth limitation by vertically disposing a single GPS antenna provided with a hemispherical antenna pattern and receiving signals from GPS satellites. In other words, it enables azimuth value to be narrowed to a sector-like azimuth value range.

Moreover, additional azimuth value narrowing can be achieved by further reversing the GPS planar antenna 180 degrees, conducting azimuth limitation by the same process in the direction in which the other side of the great semicircle faces and taking the common product of sets of the two azimuths.

Moreover, the fact that the planar patch antenna is characterized by small size and light weight enables the method to be implemented in an arrangement highly suitable for wearing on the head. After the antenna is placed on the head, if the azimuth of the direction in which one side of the great semicircle faces is first limited and the head-mounted antenna is then moved to limit the azimuth in which the direction of the other side of the great semicircle faces, it then becomes possible to further limit the azimuth value by taking the common product of sets of the two azimuths.

In addition, the method of the present invention can be implemented to markedly enhance observer convenience by making it possible to give priority to the azimuth limitation feature or to the positioning feature simply by moving the antenna between vertical orientation and horizontal orientation.

What is claimed is:

1. A method for acquiring azimuth information comprising:

a step of disposing a single GPS planar antenna having a hemispherical antenna pattern with its beam center horizontal to form a sky coverage area of antenna sensitivity that is a sky quarter-sphere in a direction GPS antenna faces bounded by a great semicircle passing through the zenith;

a step of causing a GPS receiver connected to the GPS antenna to attempt reception of signals transmitted by GPS satellites in the sky hemisphere;

a step of processing at a date processing unit signals received by the receiver to discriminate the satellites present in the coverage area;

a step of using azimuths of the satellites obtained by a positioning calculation process to arrange the satellites found to be present in the sky coverage area in clockwise order as viewed from the sky coverage area start azimuth; and a step of limiting the azimuth of a direction in which one side of the great semicircle faces within an azimuth range defined clockwise whose start azimuth is the azimuth of the satellite corresponding to the last in said order and whose end azimuth is the reverse direction from the azimuth of the satellite corresponding to the first in said order.

2. A method for acquiring azimuth information according to claim 1, further comprising:

a step of turning the GPS planar antenna 180 degrees to form a sky coverage area of antenna sensitivity that is the remaining sky quarter-sphere;

a step of causing the GPS receiver connected to the GPS antenna to attempt reception of signals transmitted by GPS satellites in the sky hemisphere and limit the azimuth of the direction in which the other side of great semicircle faces by the same steps as set out in claim 1; and a step of limiting a single azimuth by taking the common product of sets of the azimuth obtained in the first GPS antenna attitude and the azimuth obtained in the second GPS antenna attitude.

3. A method for acquiring azimuth information according to claim 1 or 2, further comprising a step of mounting the GPS antenna on the head and putting the antenna in a horizontal state or a vertical state in accordance with information to be acquired.

4. A method for acquiring azimuth information according to claim 1 or 2, further comprising a step of outputting the limited azimuth of a direction using a result output unit.

* * * * *